Figure 3:
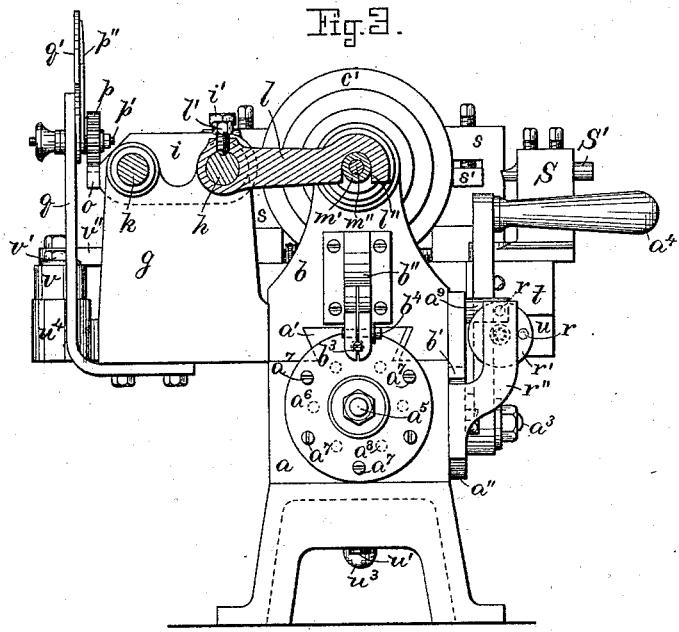

(No Model.) 2 Sheets—Sheet 1.
H. L. HALDY.
WATCH CASE SHAPING MACHINE.
No. 398,251. Patented Feb. 19, 1889.
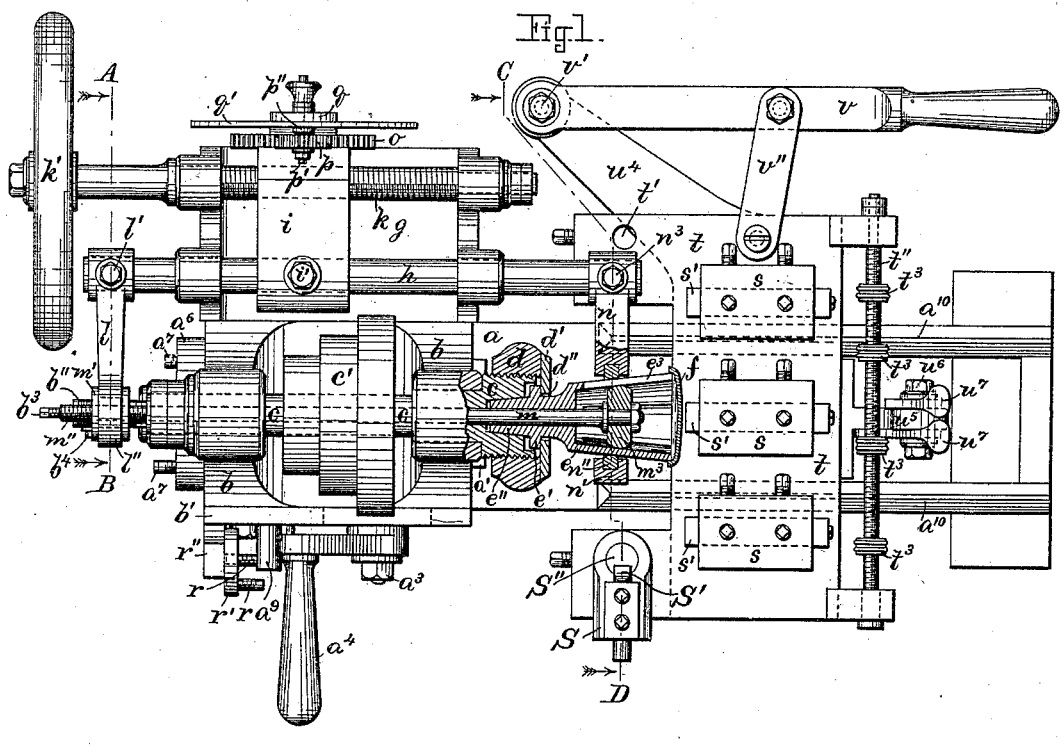
Fig. 1.
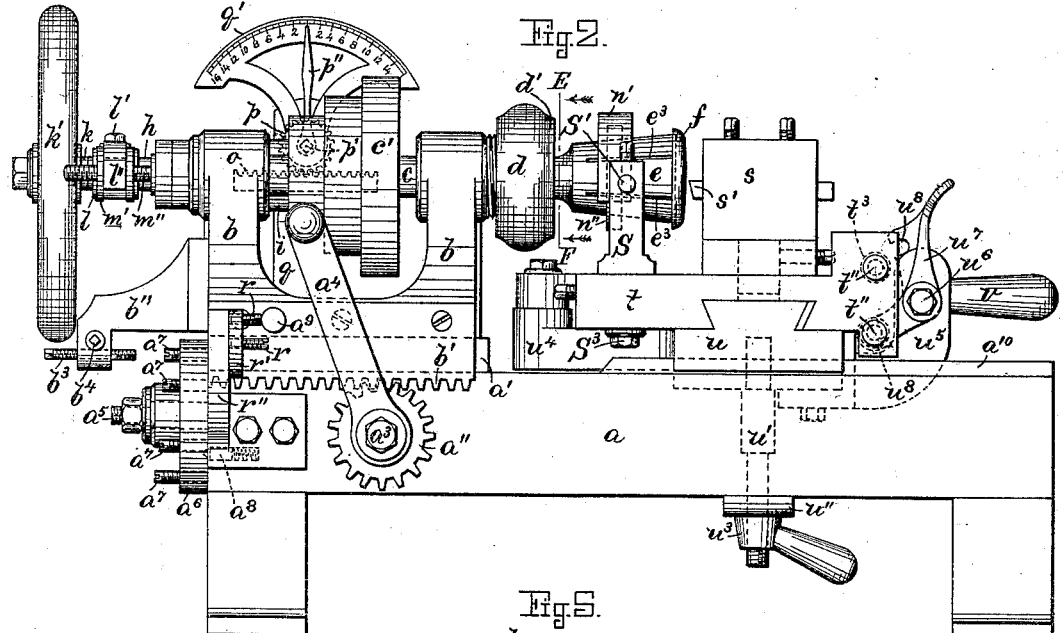
Fig. 2.
Fig. 3.
Witnesses,
Henry Chadbourn.
Selma R. Schelin.
Inventor
Henri L. Haldy.
by Alban Andrew, his atty.

(No Model.) 2 Sheets—Sheet 2.

H. L. HALDY.
WATCH CASE SHAPING MACHINE.

No. 398,251. Patented Feb. 19, 1889.

Witnesses.
Henry Chadbourn.
Selma R. Schelin.

Inventor.
Henri L. Haldy.
by Alban Andrén, his atty.

UNITED STATES PATENT OFFICE.

HENRI L. HALDY, OF WALTHAM, MASSACHUSETTS, ASSIGNOR OF ONE-HALF TO JOHN STARK, OF SAME PLACE.

WATCH-CASE-SHAPING MACHINE.

SPECIFICATION forming part of Letters Patent No. 398,251, dated February 19, 1889.

Application filed November 24, 1888. Serial No. 291,728. (No model.)

*To all whom it may concern:*

Be it known that I, HENRI L. HALDY, a citizen of Switzerland, and a resident of Waltham, in the county of Middlesex and State of Massachusetts, have invented new and useful Improvements in Watch-Case-Shaping Machines, of which the following, taken in connection with the accompanying drawings, is a specification.

This invention relates to improvements in watch-case-shaping machines, and it is carried out as follows, reference being had to the accompanying drawings, where—

Figure 4:
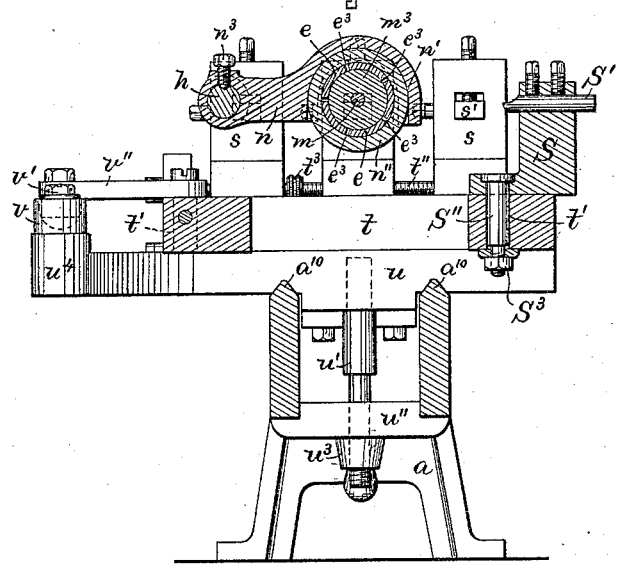

Figure 1 represents a plan view of the machine, partly shown in section. Fig. 2 represents a side elevation of the same. Fig. 3 represents a cross-section on the line A B, shown in Fig 1. Fig. 4 represents a cross-section on the line C D, also shown in Fig. 1; and Fig. 5 represents a cross-section on the line E F, shown in Fig. 2.

Similar letters refer to similar parts wherever they occur on the different parts of the drawings.

$a$ represents the bed or base of the machine, on the top of which is longitudinally adjustable the head-stock $b$, preferably in a dovetailed way, $a'$, as shown in Figs. 2 and 3. A longitudinal forward-and-back movement is imparted to the head-stock $b$ by means of the pinion $a''$, journaled on a stud or pin, $a^3$, secured to the bed $a$, and having its teeth meshing into the teeth of the rack $b'$, secured to the head-stock $b$, as shown in Figs. 1 and 2.

$a^4$ is a hand lever or crank secured to or forming a part of the pinion $a''$; and it will thus be seen that by taking hold of the said lever or handle and swinging it to the right or left a corresponding movement is imparted to the head-stock $b$ and its connections for the purpose of moving the watch-case held by the chuck to and from the shaping tool or tools, as will hereinafter be more fully described.

In bearings in the head-stock $b$ is journaled the hollow shaft $c$, to which is secured the cone-pulley $c'$, by means of which and suitable belt-power a rotary motion is imparted to said hollow shaft. The forward end of the hollow shaft $c$ is externally screw-threaded, and to it is screwed the chuck $d$, for the purpose of securing the work-holder to said hollow shaft, as shown in Figs. 1 and 2. I do not confine myself to any particular kind of chuck for this purpose; but in practice I prefer to use the kind as shown in Fig. 1, where its outer end or cap-plate $d'$ is provided with an elongated or slotted perforation, $d''$, through which is introduced the similarly-shaped flange or projection $e'$ on the tapering shank $e''$ of the expansive cup-shaped work-holder $e$, after which the latter is turned about half a revolution around its axis and the chuck $d$ screwed up, causing the tapering shank of the work-holder to be held firmly in position within a correspondingly-shaped recess in the end of the spindle $c$, as shown in Fig. 1.

The cup-shaped tapering work-holder $e$ is slitted longitudinally, as shown at $e^3$ $e^3$, Figs. 1, 2, and 3, and is thereby rendered expansive and contractive in its outer open end for the purpose of securing to it the watch-case $f$ that is to be shaped.

The watch-case $f$ may be held on the work-holder either by expanding the latter against the inner lip or edge of the watch case or ring $f$, as shown in Figs. 1 and 2, or by inserting such case or ring within the expansive work-holder and compressing the latter against the outer portion of said case or ring. In connection with the said work-holder I use mechanism for expanding and contracting it, for the purpose aforesaid, which is constructed as follows:

In one piece with the head-stock $b$, or secured to it in a suitable manner, is a bracket, $g$, in which is journaled the spindle $h$, that is capable of a longitudinal adjustment in said bracket. To the said spindle $h$ is secured the block $i$, preferably by means of a set-screw, $i'$, and through said block is screwed the screw-shaft $k$, which is arranged parallel with spindle $h$, and is journaled in the bracket $g$ in such a manner that it may be turned around its axis, but is prevented from a longitudinal motion relative to said bracket, as shown in Fig. 1.

To the rear end of the screw-shaft $k$ is secured a crank or hand wheel, $k'$, by means of which said screw-shaft is manipulated. Thus it will be seen that a longitudinal motion is imparted to the spindle $h$ by turning the screw-shaft $k$ around its axis.

To the rear end of the spindle $h$ is secured by means of a set-screw, $l'$, the lever $l$, the end of which is forked, as shown at $l''$ in Figs. 1, 2, and 3. Said forked end of the lever $l$ is made to fit between flanges or collars on the nut $m'$, that is adjustable on the screw-threaded end $m''$ of the spindle $m$, that passes loosely through the hollow spindle $c$ and shank $e''$ of the expansive work-holder $e$; and to the forward end of said spindle $m$, within the slitted work-holder $e$, is secured the circular disk or block $m^3$, which, when moved backward within the expansive work-holder, causes it to expand and to hold the watch-case $f$ securely attached to the outer edge of said expansive work-holder, as shown in Figs. 1 and 2. It will thus be seen that by the device above mentioned the slitted work-holder can be expanded for the purpose stated simply by turning the screw-shaft $k$ in one direction. For the purpose of compressing the said work-holder in case it is desired to hold a watch case or ring on the inside of the work-holder, I secure to the opposite end of the longitudinally-adjustable spindle $h$ a second lever, $n$, having a forked and grooved end, $n'$, adapted to hold and receive a ring, $n''$, that surrounds the slitted tapering work-holder $e$, as shown in Figs. 1, 2, and 4. Consequently by moving the spindle $h$ toward the right in Fig. 1 the ring $n''$ will be moved toward the larger end of the work-holder $e$, and thereby causing the latter to be contracted for the purpose mentioned.

The lever $n$ is preferably secured to the spindle $h$ by means of a set-screw, $n^3$. (Shown in Figs. 1 and 4.)

If it is desired to expand the work-holder $e$ for the purpose of securing the work against the outer edge of said work-holder, I loosen the set-screw $n^3$ sufficiently to liberate the lever $n$ and swing it upward around the spindle $h$, so as to cause it to be disconnected from the ring $n''$. If it is desired to compress or clamp the work within the work-holder, I secure the lever $n$ in position on the spindle $h$, as shown in Figs. 1, 2, and 4, and unloosen the set-screw $l'$ and swing the lever $l$ upward around the spindle $h$, so as to cause it to be disconnected from the flanged nut $m'$.

In shaping successively a number of watch cases or rings of the same size and pattern, it is important that the work-holder should be expanded or contracted equally for the successive pieces that are to be shaped and in such a manner and degree as to hold the article firmly without injuring it, and for this purpose I use, in connection with the screw-shaft $k$ and its block $i$, an indicator for the purpose of showing at a glance when the screw-shaft $k$ has been turned around sufficiently to cause the work-holder to properly hold the work, after such movement of the said screw-shaft has first been ascertained, for the desired article. Said indicator is constructed as follows: To the block $i$ is secured a rack, $o$, the teeth of which mesh in the teeth of the pinion $p$, that is journaled on the pin $p'$, secured in a suitable manner to the bracket $q$. The said bracket $q$ is secured to the bracket $g$, as shown in Fig. 3. To the bracket $q$ is secured the graduated dial $q'$, and to the pinion $p$ is secured the index-finger or pointer $p''$. (Shown in Figs. 1, 2, and 3.)

If it has been ascertained that to properly secure a certain size watch case or ring to the expansive work-holder $e$ the screw $k$ has to be turned so as to cause the pointer $p''$ to indicate, for instance, 6 on the dial $q'$, then all the operator has to do in securing successive watch cases or rings to the work-holder is to turn the screw-shaft $k$ until the finger $p''$ points to 6 on the graduated dial $q'$ after the watch case or ring has been placed outside or inside of the expansive work-holder $e$, as the case may be.

For the purpose of limiting the forward-and-back motion of the head-stock $b$ and its connections, I employ stops, as follows: To the rear end of the head-stock $b$ is secured a bracket, $b''$, through the lower rear end of which is screwed the adjustable stop-screw $b^3$, as shown in Figs. 2 and 3. The outer and lower portion of said bracket is preferably slitted, as shown in Fig. 3, and provided with a clamping-screw, $b^4$, for the purpose of securing the said stop-screw in position on the bracket $b''$ after such screw has been adjusted. To the end of the bed $a$ is pivoted on a bolt or pin, $a^5$, the circular disk $a^6$, provided with a series of rearwardly-projecting set-screws, $a^7$ $a^7$, as shown in Figs. 2 and 3. By turning said disk $a^6$ around its axis either of the said set-screws can be brought opposite and centrally in a line with the stop-screw $b^3$, so as to prevent the head-stock $b$, its work-holder, and the article held by it from being moved farther forward toward the tools when the screw $b^3$ is brought in contact with that one of the set-screws $a^7$ that is for the time being opposite to said stop-screw $b^3$, and in this manner the forward movement of the head-stock is regulated and limited.

$a^8$ is a spring-pressed pin located in a recess in the end of the bed $a$ and adapted to be forced into one of a series of recesses on the forward side of the disk $a^6$, as shown in Fig. 2.

In connection with the head-stock and its work-holder I use a series of tools hereinafter to be described, said tools being so arranged as to act successively on the article to be shaped; and it is for this purpose that I use a series of adjustable set-screws, $a^7$, arranged on the rotary disk $a^6$, so that one of said stop-screws can be easily brought opposite to the head-stock stop-screw $b^3$ simply by turning the disk $a^6$ slightly around its axis according to the feed desired on the head-stock for the corresponding tool.

For the purpose of limiting the sliding motion of the head-stock in the opposite direction I secure to the side of it a pin or projection, $a^9$, which as the head-stock is moved backward comes in contact with one of a series of regulating stop-screws, $r\ r$, adjustably secured to the disk $r'$, that is pivoted to a bracket, $r''$, secured to the bed $a$, as shown in Figs. 1, 2, and 3.

$s\ s\ s$ represent the tool-posts, having secured to them the respective shaping-tools $s'\ s'\ s'$ by means of set-screws or equivalent devices. The tool-posts $s\ s\ s$ are firmly secured to the tool-carrier $t$, that is mounted in dovetailed guides on the tool-carrier bed $u$ and is laterally movable thereon at a right angle to the motion of the head-stock $b$, as shown in the drawings.

The tool-carrier bed $u$ is adjustable to and from the work-holder $e$, and is for this purpose guided on ways $a^{10}\ a^{10}$ on the bed $a$, and is secured to the latter after being adjusted by means of the screw-bolt $u'$, cross bar or plate $u''$, and nut $u^3$, or similar devices. The tool-carrier and its tool-holders are moved forward and back on the bed $u$ by means of a hand-lever, $v$, that is pivoted at $v'$ to an arm or projection, $u^4$, on the bed $u$, and the said lever is connected to the tool-carrier $t$ by means of a link, $v''$. (Shown in Figs. 1 and 4.)

For shaping the edge or circumference of the watch case or ring $f$, I prefer to use an additional tool-post, S, having a tool, S', secured to it, as shown in Figs. 1, 2, 3, and 4. Said tool-post is secured to the tool-post carrier $t$ by means of a bolt or pin, S'', passing through said tool-post and a perforation, $t'$, in the carrier $t$ and secured to the latter by means of a nut, S³. (Shown in Figs. 2 and 4.)

In using the tool S' the bed $u$ is moved toward the right end of the bed $a$ until said tool comes opposite, or nearly so, to the edge or circumference of the article that is to be shaped, and said bed $u$ is then secured to the bed $a$ in such desired position, after which the tool-carrier $t$ is moved by the hand-lever $v$ until the tool S' is brought in contact with the edge or other portion of the article to be shaped.

One tool-post S is only shown in the drawings; but provision is made in the bed $t$ for holding two such tool-posts, as shown in Fig 1.

The tools $s'\ s'\ s'$ are to be of varying shapes for the purpose of shaping different parts of the article. For instance, one tool may be adapted for shaping the article near its edge or circumference, another for the central portion, and others for shaping intervening portions between the center and circumference, as may be desired, according to the form or pattern to be given to the said article. It is also essential in a machine of this kind that adjustable stops should be provided on the tool-carrier $t$, so as to cause the desired tool or tools to be moved to the desired positions relative to the article that is to be shaped, and for this purpose I secure to the said tool-carrier $t$ a pair of screw-threaded shafts or spindles, $t''\ t''$, one located above the other and both provided with adjustable stop-nuts $t^3\ t^3$, as shown in Figs. 1, 2, and 4.

To the bed $u$ is secured a bracket, $u^5$, and to said bracket is pivoted at $u^6$ a pair of levers, $u^7\ u^7$, each having notched projections $u^8\ u^8$, adapted to embrace one or the other of the respective screw-shafts $t''\ t''$, and it will thus be seen that by adjusting the respective nuts $t^3\ t^3$ according to the position desired for the respective tools $s'\ s'$, and by swinging the stop-levers $u^7$ against the screw-shafts $t''\ t''$, the desired tool will be brought to a stop in the desired position for doing the desired work when the tool-carrier is operated by means of the lever $v$.

The operation of the shaping-machine is as follows: The article to be shaped is secured to the expansive work-holder $e$, either on its outside or inside, as described. The shaft $c$ is set in a rotary motion by belt-power applied to the cone-pulley $c'$, and the operator takes hold of the lever $v$ with one hand and moves the tool-carrier $t$ on the bed $u$ until one of the tools $s'$ is brought to the required position for doing the desired shaping of the article, as described, after which the operator moves the head-stock $b$ toward the right in Fig. 2 by manipulating the crank or lever $a^4$, thereby causing the revolving watch case or ring to be brought in contact with the shaping-tool that is being used, and thereby causing the desired portion of the article to be given the form corresponding to that of the tool that is used. The sliding movement of the head-stock is limited by the stop mechanism hereinbefore mentioned. After a portion of the article has been shaped by one tool, the head-stock $b$ is moved backward, another tool brought in position, and the head-stock again moved forward, and so on until the article is properly shaped. In using the tool S' on the tool-post S the bed $u$ is secured to the bed $a$, so that the tool comes about opposite to the edge of the article to be shaped. The head-stock $b$ is held in a corresponding position, and its shaft $c$ is rotated, as before, after which the tool-carrier $t$ is moved by means of the lever $v$ until the tool is brought to the desired position for doing the shaping, and so on.

The operation of the machine may, however, be varied according to the work to be done without departing from the essence of my invention.

Having thus fully described the nature, construction, and operation of my invention, I wish to secure by Letters Patent and claim—

1. In a watch-case-shaping machine, a longitudinally-movable head-stock having a rotary spindle journaled therein and the cup-shaped expansive work-holder, as described, combined with the longitudinally-adjustable shaft $h$, the lever $n$, secured to said shaft, and the ring $n''$, connected to said lever for the purpose of compressing said work-holder, substantially as specified.

2. In a watch-case-shaping machine, a longitudinally-movable head-stock having a rotary tubular spindle journaled therein and the cup-shaped expansive work-holder, as described, combined with the longitudinally-adjustable shaft $h$, the lever $l$, secured to said shaft, and the central spindle, $m$, adjustably connected to said lever and having secured to it within the expansive work-holder the block or expander $m^3$, substantially as specified.

3. In a watch-case-shaping machine, a longitudinally-movable head-stock having a spindle journaled therein and provided with the expansive work-holder, as described, combined with the longitudinally-adjustable shaft $h$, and connecting mechanism, substantially as described, for expanding or contracting said work-holder, the block $i$, secured to said shaft $h$, and the screw-shaft $k$, substantially in a manner and for the purpose as specified.

4. In a watch-case-shaping machine, a longitudinally-movable head-stock having a spindle journaled therein and provided with the expansive work-holder, as described, combined with the longitudinally-adjustable shaft $h$, and connecting mechanism for clamping the work, and the indicator device, as described, consisting of the rack $o$, secured to the block $i$, the graduated dial $q'$, secured to the head-stock $b$ or its connections, and the pinion $p$, meshing into the teeth of said rack and having secured to it the index-pointer $p''$, substantially as and for the purpose set forth.

5. In a watch-case-shaping machine, a longitudinally-movable head-stock and a rotary work-holder spindle journaled therein, combined with the adjustable stop-screw $b^3$ on the said head-stock and the stop-screw carrying disk $a^6$ on the bed $a$, said disk being adapted to turn around its axis and to be locked in position, substantially as and for the purpose set forth.

6. In a watch-case-shaping machine, a longitudinally-movable head-stock and a rotary work-holder spindle journaled therein, combined with the stop projection $a^9$ on the said head-stock, and the adjustable disk $r'$, mounted on a bracket secured to the bed $a$, and provided with adjustable stop-screws $r$ $r$, substantially as and for the purpose set forth.

7. In a watch-case-shaping machine, a longitudinally-movable head-stock and a rotary work-holder spindle journaled therein, combined with the bed $u$, adjustably secured to the main bed $a$, and the tool-post carrier $t$, adapted to slide on the bed $u$, and provided with a series of shaping-tools adjustably secured to tool-posts on said carrier, substantially as and for the purpose set forth.

8. In a watch-case-shaping machine, the bed $u$ and the tool-post carrier $t$, adapted to slide thereon and provided with a series of tools and tool-posts, combined with the lever $v$, connected to the said bed and tool-post carrier, as described, and the adjustable stop device consisting of the screws $t''$ $t''$, secured to the part $t$, and having adjustable stop-nuts $t^3$ $t^3$, and the notched levers $u^7$ $u^8$, pivoted to a bracket or extension of the bed $u$, substantially as and for the purpose set forth.

In testimony whereof I have signed my name to this specification, in the presence of two subscribing witnesses, on this 19th day of November, A. D. 1888.

HENRI L. HALDY.

Witnesses:
R. E. GLANCY,
R. M. STARK.